US009623831B1

(12) United States Patent
Deng et al.

(10) Patent No.: US 9,623,831 B1
(45) Date of Patent: *Apr. 18, 2017

(54) THREE-CHAMBER FRONTAL IMPACT AIRBAG WITH CONTROLLED PRESSURE DIFFERENTIALS

(71) Applicant: Ford Global Technologies, LLC, Dearborn, MI (US)

(72) Inventors: Zhibing Deng, Northville, MI (US); Krish E. Aekbote, Novi, MI (US); Srinivas Reddy Malapati, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,759

(22) Filed: Oct. 30, 2015

(51) Int. Cl.
| | |
|---|---|
| *B60R 21/205* | (2011.01) |
| *B60R 21/231* | (2011.01) |
| *B60R 21/233* | (2006.01) |
| *B60R 21/239* | (2006.01) |
| B60R 21/01 | (2006.01) |
| B60R 21/00 | (2006.01) |

(52) U.S. Cl.
CPC .......... *B60R 21/233* (2013.01); *B60R 21/205* (2013.01); *B60R 21/231* (2013.01); *B60R 21/239* (2013.01); *B60R 2021/0044* (2013.01); *B60R 2021/0048* (2013.01); *B60R 2021/0058* (2013.01); *B60R 2021/01013* (2013.01); *B60R 2021/2395* (2013.01); *B60R 2021/23308* (2013.01); *B60R 2021/23324* (2013.01)

(58) Field of Classification Search
CPC ... B60R 21/205; B60R 21/231; B60R 21/233; B60R 2021/0044; B60R 2021/0048; B60R 2021/0058; B60R 2021/23308; B60R 2021/23324; B60R 21/239; B60R 2021/2395
See application file for complete search history.

(56) References Cited

U.S. PATENT DOCUMENTS

| | | | |
|---|---|---|---|
| 5,791,685 A | 8/1998 | Lachat et al. | |
| 5,845,935 A * | 12/1998 | Enders | ............ B60R 21/23138 280/730.1 |
| 7,264,268 B2 * | 9/2007 | Ehrke | .................. B60R 21/233 280/729 |
| 7,347,445 B2 | 3/2008 | Choi | |
| 7,431,329 B2 | 10/2008 | Taguchi et al. | |
| 7,631,891 B2 * | 12/2009 | Washino | ............... B60R 21/203 280/731 |
| 7,661,700 B2 * | 2/2010 | Imamura | .............. B60R 21/203 280/730.1 |
| 7,695,002 B2 | 4/2010 | Choi | |

(Continued)

FOREIGN PATENT DOCUMENTS

| | | |
|---|---|---|
| CN | 102975682 A | 3/2013 |
| CN | 204149989 U | 2/2015 |

(Continued)

*Primary Examiner* — Laura Freedman
(74) *Attorney, Agent, or Firm* — James P. Muraff; Neal, Gerber & Eisenberg LLP

(57) ABSTRACT

The present disclosure generally relates to a three-chambered airbag and associated system. The three-chambered airbag may comprise pressure differentials between the different chambers.

20 Claims, 4 Drawing Sheets

(56) References Cited

U.S. PATENT DOCUMENTS

| | | | |
|---|---|---|---|
| 7,810,840 B2 * | 10/2010 | Denys | B60R 21/239 |
| | | | 280/739 |
| 7,900,961 B2 | 3/2011 | Hanawa et al. | |
| 8,196,955 B2 | 6/2012 | Mendez | |
| 8,376,396 B2 * | 2/2013 | Miller | B60R 21/206 |
| | | | 280/729 |
| 8,596,678 B2 | 12/2013 | Ravenberg et al. | |
| 9,045,109 B2 * | 6/2015 | Rick | B60R 21/36 |
| 9,150,186 B1 * | 10/2015 | Belwafa | B60R 21/233 |
| 2009/0218797 A1 * | 9/2009 | Perez Garcia | B60R 21/239 |
| | | | 280/742 |
| 2015/0158452 A1 | 6/2015 | Choi et al. | |
| 2015/0307055 A1 * | 10/2015 | Cheng | B60R 21/203 |
| | | | 280/728.3 |
| 2015/0321636 A1 * | 11/2015 | Jang | B60R 21/2338 |
| | | | 280/743.2 |

FOREIGN PATENT DOCUMENTS

| | | | |
|---|---|---|---|
| DE | 102013015682 A1 | 7/2014 | |
| JP | WO 2007069064 A2 * | 6/2007 | B60R 21/233 |

* cited by examiner

THREE-CHAMBER FRONTAL IMPACT AIRBAG WITH CONTROLLED PRESSURE DIFFERENTIALS

TECHNICAL FIELD

The present disclosure generally relates to an improved airbag system. More particularly, the airbag system of the present disclosure uses pressure differentials and body contact zones to minimize the injury to passengers of motor vehicles involved in impacts.

BACKGROUND

Airbags are generally deployed to minimize the injury to persons within a motor vehicle. Frontal impact airbags are designed to prevent occupants from sustaining injuries that could be the result of occupants being propelled forward and making contact with the steering wheel or other interior part of the vehicle. These pillow-shaped airbags deploy from the instrument panel through a pyrotechnic ignition which causes the bags to rapidly fill with gas.

Current airbag systems generally comprise an airbag made of fabric which inflates upon the system recognition of an impact. However, many airbag systems deploy an airbag that is not formally confirmed to any defined shape whereby the passenger, upon contact, may slide off the airbag. In most cases, upon impact, occupants will be propelled forward as well as laterally to some degree. This is where a typical frontal airbag may not be sufficient in preventing bodily contact with the interior of the vehicle. During a collision in which there is offset or angular momentum, it is possible that the occupant may slip off the side of the airbag and make contact with the vehicle, thus increasing the likelihood of injury. There is a continuing need for new and improved airbag systems that enable a passenger to escape impacts with little or no injury.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide for an airbag system comprising: an airbag comprising a center chamber and at least two side chambers; an inflator in fluid communication with the center chamber; the center chamber in fluid communication with the at least two side chambers via internal baffle vents configured to facilitate gas flow from the center chamber to the at least two side chambers and impede gas flow from the at least two side chambers to the center chamber. The pressure in the side chambers may be greater than the pressure in the center chamber.

The different chambers form chest and head impact zones. These zones are configured to receive the head or chest/torso of the passenger upon airbag deployment. The airbag system may have a chest impact zone designed to contact the passenger's body prior to the passenger's head contacting the airbag. The passenger's chest may contact the airbag first when the depth of chest impact zone is greater than the depth of the head impact zone.

The side chambers may also be configured to deploy in an asymmetrical fashion. In these embodiments, a larger volume side chamber may deploy toward the passenger window to prevent the passenger from contacting the vehicle.

The present airbag system may be incorporated as an aspect of a vehicle or a passenger protection system.

The present disclosure also sets forth an airbag deployment method comprising: obtaining, by a sensor, data external to a vehicle; identifying, by a controller using the data, a sudden deceleration; deploying the present airbag system.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Three-Chambered Airbag System

While the three-chambered airbag system of the present disclosure may be embodied in various forms, the Figures show and this Specification describes some exemplary and non-limiting embodiments of the three-chambered airbag system. The term "three-chambered airbag system" is intended to mean both the inflatable passenger-restraining three-chambered airbag and the mechanical and chemical components (such as the inflation means, ignition means, propellant, and the like). The present disclosure is an exemplification of the three-chambered airbag system and does not limit the three-chambered airbag system to the specific illustrated and described embodiments. Not all of the depicted or described components may be required, and some embodiments may include additional, different, or fewer components. The arrangement and type of the components may vary without departing from the spirit or scope of the claims set forth herein.

One of ordinary skill in the art will appreciate the various aspects of airbag design, construction, and operation applicable to the embodiments of the present disclosure. U.S. Pat. Nos. 6,886,857, 7,857,347, 8,128,124, 8,322,748, for example, describe many such aspects and are incorporated herein by reference in their entirety.

1. Three-Chambered Airbag

Figure 1:
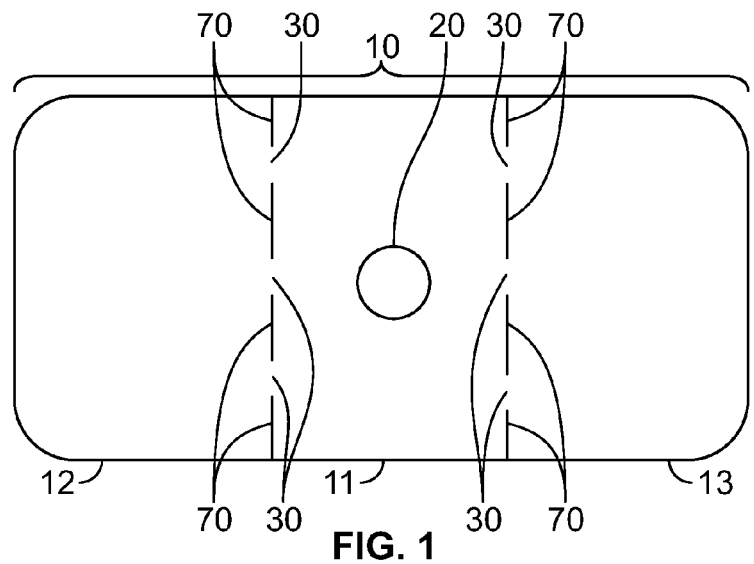
FIGS. 1 and 2 are schematics of the front view of certain aspects of the present airbag system.

The airbag of the present system comprises three distinct areas or chambers that are defined by two or more dividers disposed within the airbag so as to divide the interior into a center chamber and at least two side chambers. When uninflated, the three-chambered airbag is stored within the instrument panel on the passenger's side of the vehicle. The airbag may be constructed out of any pliable material, including polyamide 6, 6 fiber, polyesters, and others, which have the appropriate thermal capacity, toughness, modulus, etc. Representative fabrics for such use are disclosed in U.S. Pat. Nos. 4,921,735; 5,093,163; 5,110,66; 5,236,775; 5,277,230; 5,356,680; 5,477,890; 5,508,073; 5,503,197; 5,704,402, all of which are incorporated herein by reference in their entirety. The airbag may be made from a single layer or a plurality of layers. FIG. 1 illustrates aspects of one example embodiment of the three-chambered airbag system. Other embodiments of the three-chambered airbag system may include different, fewer, or additional components than those described below and shown in FIG. 1.

The three-chambered airbag system includes an inflator 20, an airbag 10 comprising two side chambers 12, 13, a center chamber 11, and at least two internal baffle vents 30 integral to dividers 70. The inflator 20 may be in communication with a controller and associated sensors. The inflator is configured to quickly introduce gas, also known as inflator gas, into the airbag system 10. The rate of inflation and gases suitable for use in the present system are known to those skilled in the art.

Once gas is introduced into the airbag center chamber 11, the gas passively diffuses through the internal baffle vents 30 in the dividers 70 to the side chambers 12, 13. In certain embodiments, the baffle vents 30 control the rate of flow from the center chamber to the side chamber through varying the diameter or geometry of the gas flow holes within the internal baffle vents 30.

Figure 2:
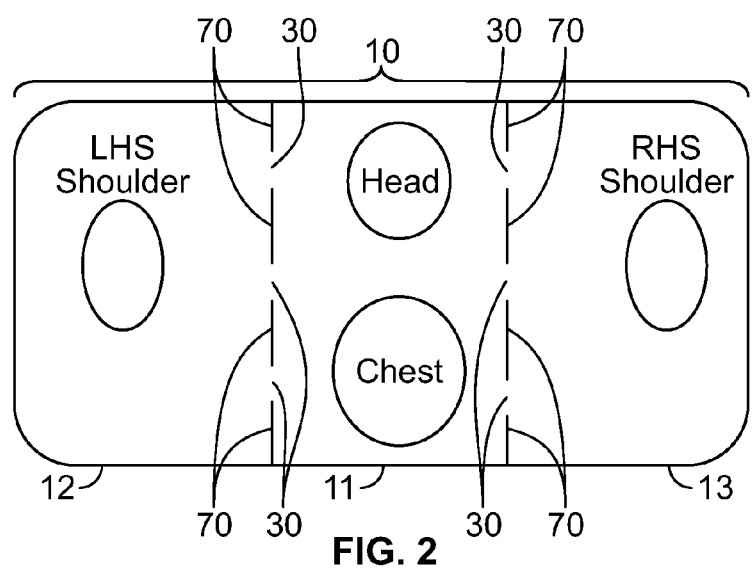

FIG. 2 shows the contact zones for different parts of the passenger's body. The airbag system is configured such that after airbag deployment, the passenger's left shoulder should contact a side chamber 12; the passenger's right shoulder should contact a side chamber 13; and the passenger's head and chest should contact the center chamber 11. The passenger's head may contact the upper portion of the center chamber 11, which is referred to as the head impact zone. The passenger's chest may contact the middle and lower portions of the center chamber 11, which is referred to as the chest impact zone.

Figure 3:
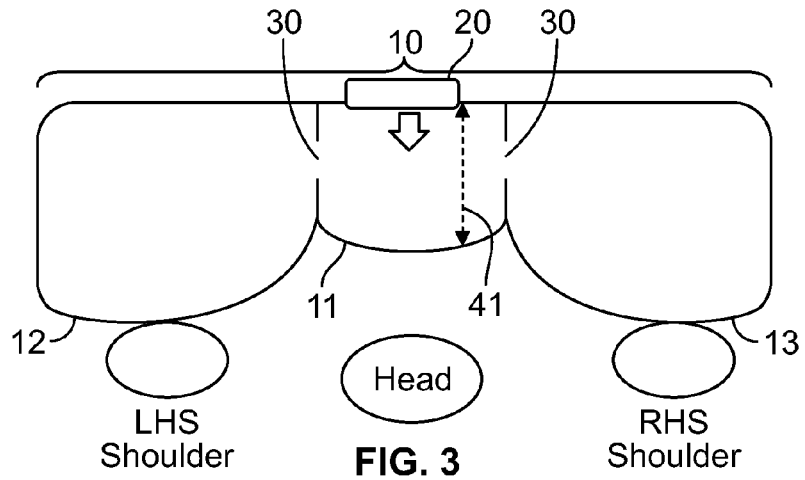
FIG. 3 is a top view of a horizontal cross-section of the present airbag system designed to contact the head of the passenger after the airbag is deployed.
Figure 4:
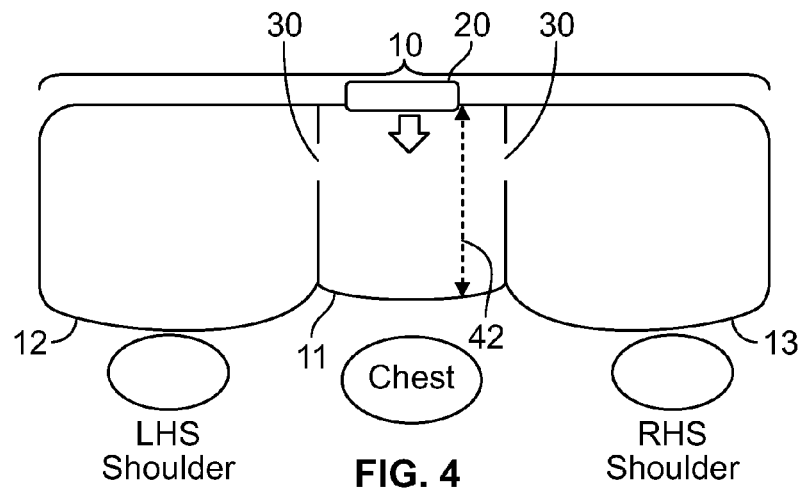
FIG. 4 is a top view of a horizontal cross-section of the present airbag system designed to contact the chest or torso of the passenger after the airbag is deployed.

FIGS. 3 and 4 depict a vertical view of a horizontal cross-section of different contact zones of the present airbag system. FIG. 3 shows a cross-section of the head impact zone, which is located in the upper portion of the airbag. FIG. 3 shows inflator gas is first introduced into the center chamber 11 from the inflator 20. The inflator gas flows from the center chamber 11 through the internal baffle vents 30 to the side chambers 12, 13. FIG. 3 shows the airbag as fully inflated. Once fully inflated, the pressure of the center chamber may range from approximately 80 to approximately 180 kPa. Once fully inflated, the pressure in the side chambers may range from approximately 80 to approximately 250 kPa. The fully inflated airbag has a configuration designed to contact and stabilize the passenger's shoulders prior to contacting and stabilizing the passenger's head. To accomplish this objective, the airbag is designed to have a particular center chamber depth for the head impact zone 41. In embodiments, the center chamber depth for the head impact zone 41 is approximately 300 mm. Different chamber depths may be achieved through using a specifically-sized airbag or the use of tethers to limit the longitudinal expansion of a particular chamber of the airbag or a particular portion of a chamber of the airbag. For example, a two tethers may be disposed within a central chamber; one shorter tether for the head impact zone (i.e., the upper portion of the center chamber) and a longer tether for the chest impact zone (i.e., the middle and lower portion of the center chamber).

Additional longitudinal or latitudinal tethers may be disposed within or along the outside perimeter of the present airbag. In embodiments, these tethers can serve to form the present airbag into a particular geometry. In other embodiments, these tethers can serve to reinforce other tethers present within the present airbag. Use of tethers in the present airbag allow the inflated geometry of the airbag to be convex, concave, or any other shape desired.

FIG. 4 shows a cross-section of the chest impact zone, which is located in the middle and bottom portions of the center chamber. FIG. 4 shows inflator gas is first introduced into the center chamber 11 from the inflator 20. The inflator gas flows from the center chamber 11 through the internal baffle vents 30 to the side chambers 12, 13. FIG. 4 shows the airbag as fully inflated. The fully inflated airbag has a configuration designed to contact and stabilize the passenger's shoulders and chest prior to contacting and stabilizing the passenger's head. To accomplish this objective, the airbag is designed to have a particular center chamber depth for the chest impact zone 42. In embodiments, the center chamber depth for the chest impact zone 42 is approximately 800 mm.

Figure 5:
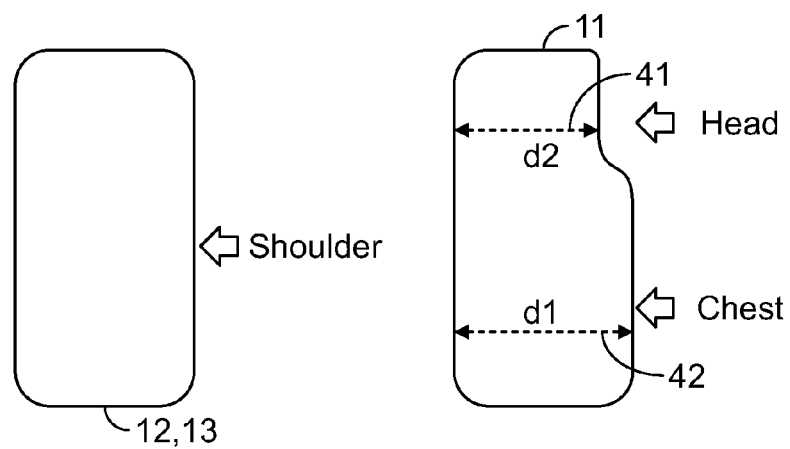
FIG. 5 is a side view of vertical cross-sections of the present airbag system.

FIG. 5 depicts a schematic side view of a vertical cross-section of the present airbag. The center chamber 11 shows the different depths of the center chamber. The depth of the center chamber at the head impact zone 41 is less than the depth of the center chamber at the chest impact zone 42. In embodiments, the depth of the center chamber at the head impact zone 41 comprises a range from approximately 100 to approximately 500 mm; alternatively, approximately 200 to approximately 400 mm; alternatively, approximately 250 to approximately 350 mm; or alternatively, approximately 300 mm. In embodiments, the depth of the center chamber at the chest impact zone comprises a range from approximately 600 to approximately 1000 mm; alternatively, from approximately 700 to approximately 900 mm; alternatively, from approximately 750 to 850 mm; or alternatively, approximately 800 mm. Different chamber depths can be modulated through the use of adaptive tethers.

Figure 6:
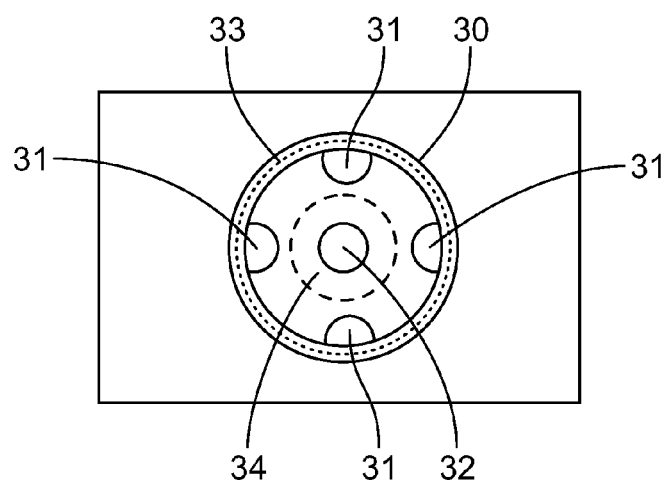
FIG. 6 shows one embodiment of the baffle vents of the present airbag system.

FIG. 6 shows an embodiment of an internal baffle vents 30. In this embodiment, the internal baffle vents 30 is affixed to the divider 70, which may be made of airbag material, through conventional techniques along the outer edges of the internal baffle vents 33. The internal baffle vents 30 comprises a plurality of air vent paths 31, 32. In this embodiment, a total of five air vent paths are shown. Four air vent paths are not aligned with the hole in the airbag material 31. One air path hole is aligned with the hole in the divider 32. This type of design allows air to flow freely through the aligned air vent path 32 and in a restricted manner through the non-aligned air vent paths 31. The gas flow may be restricted to one directional because of a flap that covers the non-aligned air vent paths 31. This flap allows air to enter, but impedes any gas flow from the side chamber 12, 13 to the center chamber 11. The gas flow may be restricted to one directional because the material that comprises the divider 70 may serve as a plug to impede air from flowing from the side chamber to the center chamber.

Figure 7:
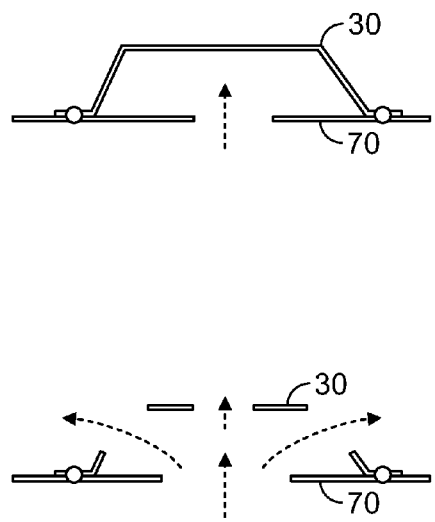
FIGS. 7 and 8 are schematics showing the airflow through the baffle vents of the present airbag system.

FIG. 7 further depicts an embodiment the internal baffle vents 30 disposed over a divider 70. In this embodiment, the arrows show gas flow up to the vent 30 and, once a sufficient pressure in the center chamber is achieved, the gas flows paths open from the center chamber to a side chamber. In other embodiments, the gas flow paths may be open at all times and do not require air pressure to open.

Figure 8:
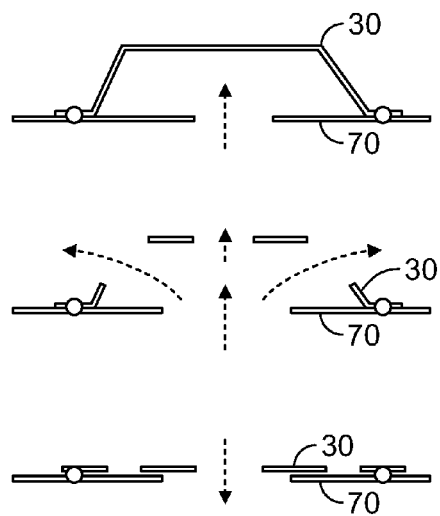

FIG. 8 further depicts an embodiment of the present system and how gas flows through the internal baffle vents 30 to a side chamber and then impedes achieving a pressure equilibrium between the center and one or more side chambers. In this embodiment, the internal baffle vents 30 facilitates gas flow from the center chamber to a side chamber as in the same manner described in FIG. 7. However, once the pressure is greater in a side chamber relative to the center chamber, air is impeded from flowing from a side chamber to the center chamber by closing one or more of the gas flow paths. The closure of the gas flow paths may be achieved through the use of the internal baffle vents design disclosed herein. The closure mechanism shown in FIG. 8 is where the internal baffle vents 30, when pressure is greater in a side chamber relative to the center chamber, flattens such that one or more of the gas flow paths is plugged or blocked by the material that comprises the divider 70. In some embodiments, the airbag fabric comprises the divider. In some embodiments, the rate of gas flow into a side chamber from the center chamber is greater than the rate of gas flow from the side chamber to the center chamber. In other embodiments, the number of gas flow paths for fluid passing from the center chamber to a side chamber is greater than the number of gas flow paths for fluid passing from a side chamber to the center chamber.

Figure 9:
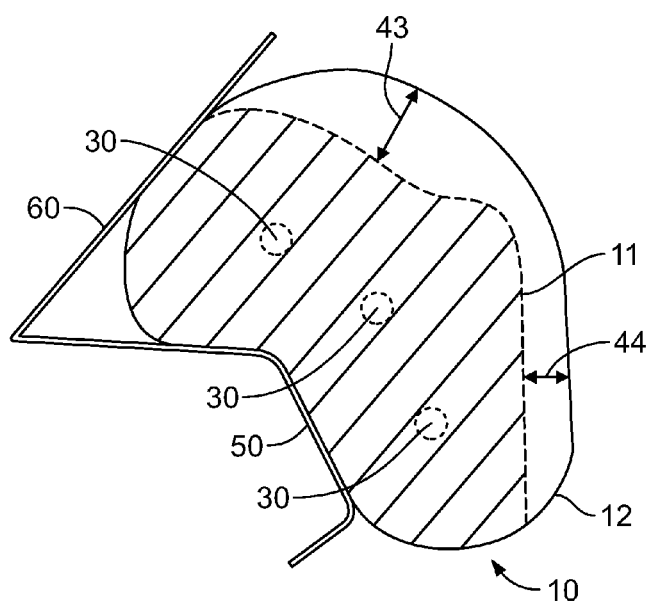
FIG. 9 is a side view of a deployed airbag of the present system.

FIG. 9 shows the present airbag after it has been deployed into the passenger cabin. The airbag is configured to be ejected from the instrument panel 50 to fill the passenger area up to an including contacting the windshield 60. Certain internal baffle vents 30 are depicted. The solid line shows the contours of a side chamber 12 of the present airbag. The dotted line shows the contours of a center chamber 11 of the present airbag. FIG. 9 also shows how the depth of the center chamber along the different impact zones varies the distance from the edge of the center chamber 11 to the edge of a side chamber 12 at the head impact zone 43 and at the chest impact zone 44.

Figure 10:
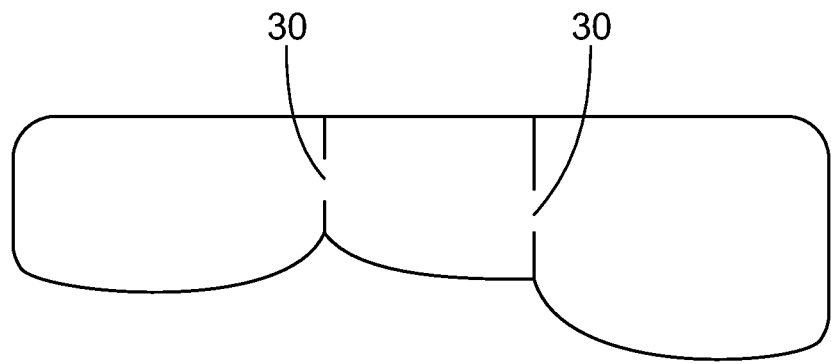
FIG. 10 is a top view of a horizontal cross-section of one embodiments of the present airbag system.

FIG. 10 depicts an embodiment of the present airbag system where an aspect of the system comprises an asymmetrical side chamber configured to prevent the passenger from impacting the vehicle, particularly the passenger window or casings thereof. FIG. 10 shows an embodiment particularly suitable for when the passenger is seated to the right of the driver of the vehicle, such as in the United States.

Figure 11:
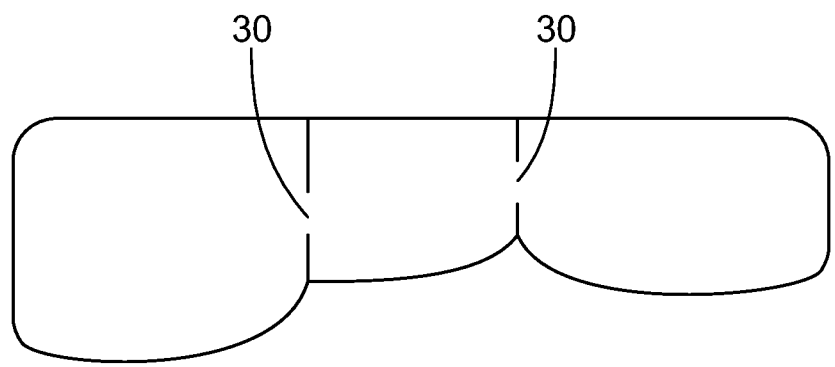
FIG. 11 is a top view of a horizontal cross-section of another embodiments of the present airbag system.

FIG. 11 depicts an embodiment of the present airbag system where an aspect of the system comprises an asymmetrical side chamber configured to prevent the passenger from impacting the vehicle, particularly the passenger window or casings thereof. FIG. 11 shows an embodiment particularly suitable for when the passenger is seated to the left of the driver of the vehicle, such as in the United Kingdom or Australia.

The asymmetry of the side chambers shown in FIGS. 10 and 11 can be achieved through the use of tethers. In these embodiments, the asymmetrical side chamber has a greater volume than the other side chamber. In other words, the side chamber that deploys towards the passenger window has a greater volume than the side chamber that deploys towards the middle of the vehicle.

The present airbag may have different aspects of the airbag joined via rip stitch when in an undeployed configuration. For example, an aspect of at least one side chamber may be joined via rip stitch to an aspect of the center chamber.

2. The Associated System

The present airbag system may be an aspect of a passenger protection system comprising a plurality of airbags, sensors, and other safety equipment to protect the passenger from injury.

The present airbag system comprises an airbag and other components to recognize when to deploy the airbag into the passenger cabin and effectively deploy the airbag into the passenger cabin. The airbag system comprises an airbag, inflator, and an airbag sensing system. In embodiments, the airbag sensing system comprises electromechanical sensors. In preferred embodiments, the airbag sensing system comprises multi-point electronic sensors. In preferred embodiments, the airbag sensing system is capable of discriminating collision mechanics for potential airbag deployment in front, side, and rollover accidents. In other embodiments, the airbag sensing system may comprise one or more of the following: sensors to determine seat belt use status, sensors to determine seat track location, and sensors to determine the occupant size classification. Excitation of one of more sensors in the airbag sensing system may cause the inflator to be activated and the airbag to be deployed into the passenger cabin.

The airbag sensing system may be configured to generate a detection signal in response to detecting a collision event. The system may also have a controller, which is configured to receive the detection signal from the sensor and generate an actuation signal in response to the detection signal. Further, the system may have an inflator, which is configured to receive the actuation signal from the controller and produce gas in response to the actuation signal.

Deployment of the airbag may comprise ignition of propellant material causing an explosive release of gasses filing the three-chambered airbag to a deployed state which can absorb the impact of the forward and/or lateral movement of a body and dissipate its energy means of rapid venting of the gas. The entire sequence of events occurs within about 100 milliseconds.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An airbag system comprising:
    an airbag comprising a center chamber and at least two side chambers;
    an inflator in fluid communication with the center chamber;
    the center chamber in fluid communication with the at least two side chambers via internal baffle vents, wherein each internal baffle vent comprises:
  a center gas flow hole configured to remain open at all times and allow fluid to freely pass between the center chamber and the at least two side chambers and
  one or more peripheral gas flow holes configured to open to allow fluid to freely pass from the center chamber to the at least two side chambers and to close to prevent fluid from flowing from the at least two side chambers into the center chamber.

2. The airbag system of claim 1, wherein gas pressure within the at least two side chambers is greater than the pressure in the center chamber when the airbag is fully inflated.

3. The airbag system of claim 2, wherein the gas pressure of the center chamber is approximately 80 kPa.

4. The airbag system of claim 2, wherein the gas pressure of the at least two side chambers is greater than 80 kPa.

5. The airbag system of claim 1, further comprising a chest impact zone and a head impact zone, wherein the system is configured to receive a passenger after impact, into the chest impact zone prior to the passenger contacting the head impact zone.

6. The airbag system of claim 5, wherein the depth of the chest impact zone is greater than the depth of the head impact zone.

7. The airbag system of claim 6, wherein the depth of the chest impact zone is approximately 800 mm.

8. The airbag system of claim 6, wherein the depth of the head impact zone is approximately 300 mm.

9. The airbag system of claim 6, wherein the depth of the chest impact zone is approximately 800 mm and the depth of the head impact zone is approximately 300 mm.

10. The airbag system of claim 1, wherein the gas pressure of the center chamber is approximately 80 to approximately 250 kPa and the gas pressure of the at least two side chambers is at least 80 to approximately 180 kPa.

11. The airbag system of claim 1, wherein one of the at least two side chambers is asymmetrical.

12. The airbag system of claim 11, wherein the one of the at least two side chambers is located towards a passenger window in a vehicle.

13. The airbag system of claim 1, wherein the at least two side chambers comprises two side chambers, wherein one side chamber has a greater volume than the other side chamber.

14. The airbag system of claim 13, wherein the side chamber with the greater volume deploys towards a passenger window.

15. An airbag deployment method comprising:
  obtaining, by a sensor, data external to a vehicle;
  identifying, by a controller using the data, a sudden deceleration;
  deploying an airbag system as described in claim 1.

16. A vehicle comprising an airbag system as described in claim 1.

17. A passenger protection system comprising an airbag system as described in claim 1.

18. The airbag system of claim 1, wherein each internal baffle vent is disposed over a hole in a chamber divider, wherein the chamber divider substantially separates adjacent chambers.

19. The airbag system of claim 18, wherein one or more peripheral gas flow holes are partially or completely blocked by a portion of the chamber divider when fluid attempts to enter the center chamber from one of the at least two the side chambers.

20. A vehicle airbag comprising:
  internal baffle vents disposed between a central chamber and a plurality of side chambers,
  wherein each internal baffle vent comprises an always open central fluid passage and a plurality of peripheral fluid passages, wherein the peripheral fluid passages are configured to allow fluid to flow freely from the central chamber to an adjacent side chamber and prevent fluid from flowing from the adjacent side chamber to the central chamber.

* * * * *